United States Patent
Aistrope (10) Patent No.: US 10,754,976 B2
(45) Date of Patent: Aug. 25, 2020

(54) CONFIGURING IMAGE AS PRIVATE WITHIN STORAGE CONTAINER

(71) Applicant: Microsoft Technology Licensing, LLC, Redmond, WA (US)

(72) Inventor: Damien P Aistrope, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 15/441,306

(22) Filed: Feb. 24, 2017

(65) Prior Publication Data
US 2018/0247075 A1     Aug. 30, 2018

(51) Int. Cl.
| G06F 21/00 | (2013.01) |
| G06F 21/62 | (2013.01) |
| H04L 29/06 | (2006.01) |
| G06F 16/51 | (2019.01) |
| G06F 16/58 | (2019.01) |
| H04N 5/44  | (2011.01) |

(52) U.S. Cl.
CPC .......... *G06F 21/6245* (2013.01); *G06F 16/51* (2019.01); *G06F 16/5866* (2019.01); *G06F 21/6209* (2013.01); *H04L 63/08* (2013.01); *H04L 63/10* (2013.01); *G06F 2221/2141* (2013.01); *H04N 5/44* (2013.01)

(58) Field of Classification Search
CPC .......... G06F 21/6245; G06F 17/30268; G06F 17/3028; G06F 21/6209; G06F 2221/2141; H04L 63/08; H04L 63/10; H04N 5/44
See application file for complete search history.

(56) References Cited

U.S. PATENT DOCUMENTS

| 8,923,551 | B1  | 12/2014 | Grosz et al. |
| 2003/0122839 | A1* | 7/2003 | Matraszek ............... G06F 16/58 345/581 |
| 2004/0070678 | A1  | 4/2004 | Toyama et al. |
| 2009/0019553 | A1* | 1/2009 | Narayanaswami .......... H04L 63/0428 726/28 |
| 2009/0125560 | A1* | 5/2009 | Munekuni ................ G06F 16/58 |
| 2010/0125603 | A1* | 5/2010 | Lehikoinen .......... G06F 21/6218 707/783 |
| 2011/0072034 | A1* | 3/2011 | Sly ........................ G09B 29/106 707/769 |

(Continued)

OTHER PUBLICATIONS

"Search Report Issued in PCT Application No. PCT/US18/018651", dated Apr. 24, 2018, 13 Pages.

(Continued)

*Primary Examiner* — Ghodrat Jamshidi
(74) *Attorney, Agent, or Firm* — Michael Best & Friedrich LLP (57) ABSTRACT

An image is configured as private within a storage container. An image processing application initiates operations to configure the image as private upon receiving the image captured by an image capture device. A metadata table is generated for the image. The metadata table includes a privacy tag. A privacy value is determined for the privacy tag. Next, the privacy tag is configured based on the privacy value. The privacy tag determines an access to the image based on the privacy value. The image is stored with the metadata table in a storage container. The storage container is hosted locally or in a cloud based storage.

16 Claims, 7 Drawing Sheets

(56) References Cited

U.S. PATENT DOCUMENTS

| | | |
|---|---|---|
| 2011/0296308 A1 | 12/2011 | Yi |
| 2011/0302308 A1* | 12/2011 | Prodan .................. G06Q 20/10 709/225 |
| 2013/0066963 A1* | 3/2013 | Odio ...................... G06Q 10/10 709/204 |
| 2013/0088616 A1* | 4/2013 | Ingrassia, Jr. .......... H04N 5/772 348/231.5 |
| 2013/0101219 A1* | 4/2013 | Bosworth ........ H04N 21/44008 382/195 |
| 2013/0101220 A1* | 4/2013 | Bosworth ........... G06F 17/3079 382/195 |
| 2013/0104080 A1* | 4/2013 | Bosworth .............. G06Q 10/10 715/838 |
| 2013/0156331 A1* | 6/2013 | Kurabayashi .......... G06K 9/036 382/224 |
| 2013/0308000 A1* | 11/2013 | Kitajima ................. G06F 3/005 348/207.1 |
| 2014/0173747 A1 | 6/2014 | Govindaraju |
| 2014/0199970 A1* | 7/2014 | Klotz .................... H04W 12/02 455/411 |
| 2014/0250126 A1* | 9/2014 | Baldwin ............. G06F 17/3028 707/737 |
| 2015/0018023 A1* | 1/2015 | Tomii .................. G06F 17/2785 455/466 |
| 2015/0019523 A1* | 1/2015 | Lior ..................... G06Q 10/109 707/708 |
| 2015/0052165 A1 | 2/2015 | Sauve et al. |
| 2015/0104006 A1 | 4/2015 | Holman et al. |
| 2015/0245199 A1 | 8/2015 | Blitzstein |
| 2016/0004723 A1* | 1/2016 | Pretel ................ G06F 17/30241 707/769 |
| 2016/0188902 A1* | 6/2016 | Jin ...................... G06F 21/6245 726/28 |
| 2016/0246996 A1* | 8/2016 | Khoo ...................... G06F 16/00 |
| 2017/0039225 A1* | 2/2017 | Brewington ....... G06K 9/00664 |
| 2017/0154207 A1* | 6/2017 | Sasaki ................ G06F 21/6245 |
| 2018/0041696 A1* | 2/2018 | Balasubramanian ... C40B 40/06 |
| 2018/0189505 A1* | 7/2018 | Ghafourifar ........ G06F 21/6209 |

OTHER PUBLICATIONS

Story, Derrick, "Camera Roll vs. Photostream", https://www.lynda.com/Flickr-tutorials/Camera-Roll-vs-Photostream/435438/490103-4.html, Published on: Apr. 27, 2016, 2 pages.

Tankoyeu, et al., "Personal photo indexing", In Proceedings of 20th ACM international conference on Multimedia, Oct. 29, 2012, pp. 1341-1342.

"iCloud Photo Sharing", https://support.apple.com/en-in/HT202786, Published on: Dec. 6, 2016, 4 pages.

Ames, et al., "Requirements for mobile photoware", In Journal of Personal and Ubiquitous Computing, vol. 14, Issue 2, Feb. 2010, pp. 95-109.

"Exif", https://en.wikipedia.org/wiki/Exif, Retrieved on: Jan. 17, 2017, 8 pages.

* cited by examiner

CONFIGURING IMAGE AS PRIVATE WITHIN STORAGE CONTAINER

BACKGROUND

Application consumption and use has significantly improved and expanded tasks that may be accomplished by users. Users may interact with an application through audio, tactile, and similar forms of input and perform a broad array of tasks. With the development of faster and smaller electronics for computing devices, smaller size devices such as handheld computers, smart phones, tablet devices, and comparable devices have become common. Such devices provide a wide variety of applications with features such as image capture, image processing, and content production. Many such applications render content through a display and enable users to provide input associated with the applications' operations.

Content generation by mobile devices has significantly expanded as capabilities offered by mobile devices have grown. Image capture and distribution is a modern feature provided by a mobile device that has become central to interactions of a user. However, there are currently significant gaps when restricting access to captured images by external entity(s). Lack of relevant privacy features embedded in a captured image lead to poor management of valuable resources when attempting to distribute the image or granting third party access to the image.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to configuration of an image as private within a storage container. An image processing application, according to embodiments, may initiate operations to configure the image as private upon receiving the image captured by an image capture device. A metadata table may be generated for the image. The metadata table may include a privacy tag. A privacy value may be determined for the privacy tag. Next, the privacy tag may be configured based on the privacy value. The privacy tag may determine an access to the image based on the privacy value. The image may be stored with the metadata table in the storage container. The storage container may be hosted locally or in a cloud based storage.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, an image processing application may configure an image as private within a storage container. In an example scenario, the image processing application may receive the image captured by an image capture device. The image capture device may include a camera of a mobile computing device such as a smartphone. A metadata table may be generated for the image. The metadata table may include an exchangeable image file format (EXIF) table with tag and value pairs describing various attributes associated with the image.

The metadata table may include a privacy tag. The privacy tag may be a label and/or a description for a privacy value. The privacy value may be determined for the privacy tag. Next, the privacy tag may be configured based on the privacy value. The privacy tag may determine an access to the image based on the privacy value. Options for the privacy value may include private (that denies access to the image by unauthorized users) and public (that provides access to the image). The image may be stored with the metadata table in the storage container. The storage container may include a folder and/or a file, among others. The storage container may be hosted locally or in a cloud based storage.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to configure an image as private within a storage container. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1:
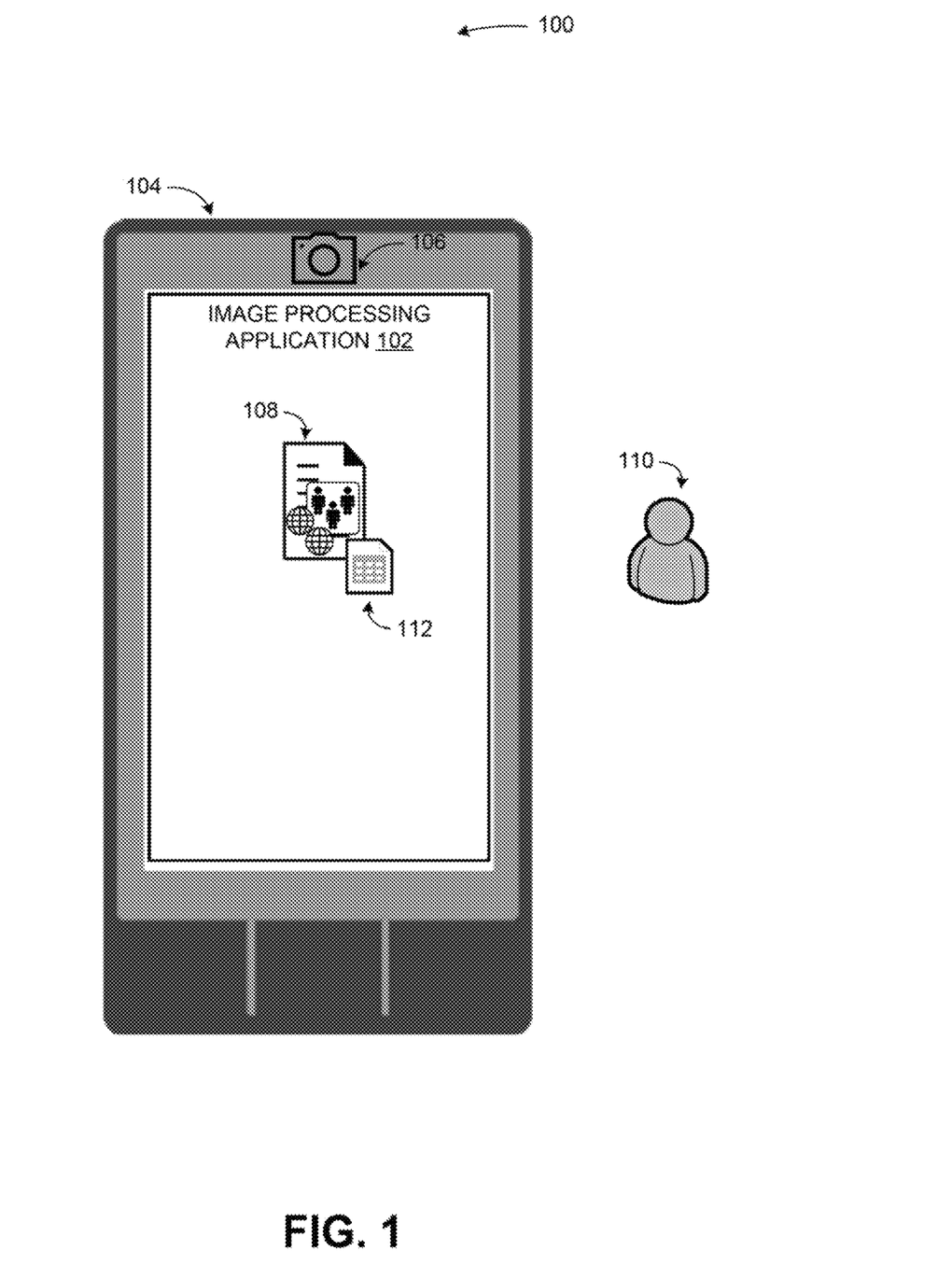
FIG. 1 is a conceptual diagram illustrating an example of configuring an image as private within a storage container, according to embodiments.

FIG. 1 is a conceptual diagram illustrating examples of configuring an image as private within a storage container, according to embodiments.

In a diagram 100, a computing device 104 may execute an image processing application 102. The computing device 104 may include a physical computer and/or a mobile computing device such as a smart phone and/or similar ones. The computing device 104 may also include a special purpose and/or configured device that is optimized to execute image processing operations associated with the image processing application 102. For example, the computing device 104 may include physical components such as an image capture device 106 that are custom built to capture an image 108 and provide the image 108 for processing by the image processing application 102 through computation core(s) tailored to configure the image 108 as private within a storage container.

The computing device 104 may execute the image processing application 102. The image processing application 102 may include an operating system, a firmware, and/or an image management application associated with the computing device 104, among others. The image processing application 102 may initiate operations to configure the image 108 as private upon receiving the image 108 captured by the image capture device 106. The image capture device 106 may include a camera module of the computing device 104. A metadata table 112 may be generated for the image 108. The metadata table 112 may include an EXIF table with tag and value pairs describing various attributes associated with the image 108.

The metadata table 112 may include a privacy tag. The privacy tag may be a label and/or a description for a privacy value. The privacy value may be determined for the privacy tag. The privacy tag may be configured based on the privacy value. The privacy tag may determine an access to the image 108 based on the privacy value. Options for the privacy value may include private (that denies access to the image 108 by unauthorized users) and public (that provides access to the image 108). The image 108 may be stored with the metadata table 112 in the storage container. The storage container may include a folder and/or a file, among others hosted locally or in a cloud based storage.

The computing device 104 may communicate with other client device(s) or server(s) through a network. The network may provide wired or wireless communications between network nodes such as the computing device 104, other client device(s) and/or server(s), among others. Previous example(s) to configure the image 112 as private within a storage container with the image processing application 102 are not provided in a limiting sense. Alternatively, the metadata table 112 may be generated by an application programming interface (API) and/or a third party application by processing the image automatically or in response to interaction(s) with a user 110. The user 110 may include a stakeholder who captured the image 108 and/or an editor or the image 108, among others. Furthermore, a service hosted by a physical server may provide a client interface such as the image processing application 102 that generates the metadata table 112 for the image 108 for storage at the computing device 104 locally or for storage at a cloud based storage.

The user 110 may interact with the image processing application 102 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 104, the image processing application 102, embodiments are not limited to these components or system configurations and can be implemented with other system configuration employing fewer or additional components.

Figure 2:
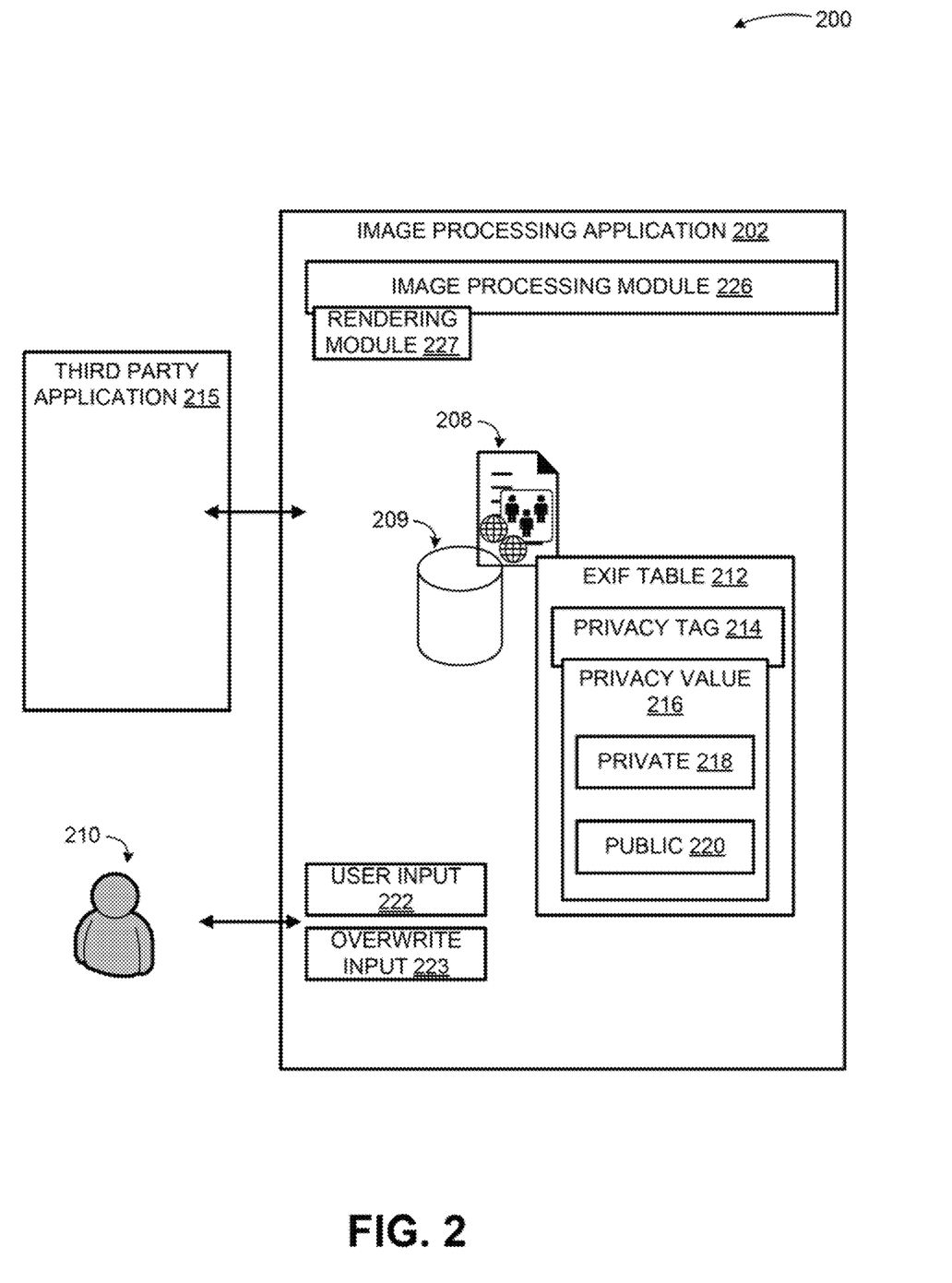
FIG. 2 is a display diagram illustrating example components of an image processing application that configures an image as private within a storage container, according to embodiments.

FIG. 2 is a display diagram illustrating example components of an image processing application that configures an image as private within a storage container, according to embodiments.

In a diagram 200, an image processing module 226 of an image processing application 202 may process an image 208 captured by an image capture device (such as a camera) associated with a computing device (that executes the image processing application 202). A metadata table such as an EXIF table 212 may be created for the image 208. The EXIF table may include tag and value pairs that define attributes associated with the image 208.

The image processing module 226 may add a privacy tag 214 and a privacy value 216 associated with the privacy tag 214 to the EXIF table 212 of the image 208 to define a privacy state of the image 208. The privacy value 216 may define the privacy state as private 218 or public 220. A designation of the privacy value 216 as private 218 may prevent an access to the image 208 to any entity other than a user 210 who may be a creator and/or an editor of the image 208. A designation of the privacy value 216 as public may grant an access to the image 208 to an entity such as a third party application 215. An example of the third party application 215 may include a social networking application (or service), and/or an image editing application, among others.

A rendering module 227 of the image processing application 202 may store the image 208 with the EXIF table 212 in a storage container 209. An example of the storage container 209 may include a folder and/or a file, among others that are hosted by a local storage or a cloud based storage (in a distributed storage solution).

Furthermore, the image processing module 226 may infer the privacy value 216 based on a user attribute of the user 210, an image capture location, and an image content. For example, history information associated with the user 210 (in relation to designation of other privacy tags associated with other images) may be analyzed to determine a preference of the user 210 to designate the privacy tag(s) associated with previous image(s). The preference may be used to designate the privacy value 216 as private 218 or public 220. In another example scenario, the image location may be correlated with a sensitive site (such as workplace, guarded location and/or items, among others). Alternatively, the image content may be analyzed to detect sensitive items in the image that are automatically (such as OCR) or manually identified by the user 210 (for example, bank account number, among others). In such a scenario, the privacy value 216 may be designated as private 218.

In an example scenario, the image processing module 226 may designate the privacy value 216 as private 218 in response to a user input 222 to designate the privacy value 216 as private 218. Subsequently, a request for the image 208 may be received from the third party application 215. A response rejecting the request may be transmitted to the third party application 215. The response may include a notification that describes the image 208 as private 218.

Alternatively, in response to a request for the image 208 by the third party application 215, the image processing module 226 may query the user 210 for an overwrite input 223 to designate the privacy value 216 from private 218 to public 220. Upon receiving the overwrite input 223, the privacy value 216 may be designated as public on the EXIF table 212 of the image 208. Since, the image 208 is designated as public, the image processing module 226 may provide the image 208 to the third party application 215.

The overwrite input 223 may be analyzed to detect additional instructions such as an instruction to maintain the privacy value 218 as public 220 for a single instance. The user 210 may wish to grant access to the image 208 solely to the third party application 204. The user's wish may be fulfilled by allowing the user 210 to change the privacy value 216 to public 220 for a single instance of access by the third party application 215. In such a scenario, upon providing the image 208 to the third party application 215, the privacy value 216 may be designated as private 218 on the EXIF table 212 to prevent further access by other entity(s).

Alternatively, the overwrite input 223 may be detected to include an instruction to maintain the privacy value 216 as public permanently. In an example scenario, the user 210 may wish to continue providing the image 208 (that was previously designated as private 218) to other entity(s). In such a scenario, the image processing module 226 may maintain the privacy value 216 as public on the EXIF table 212 of the image 208.

Figure 3:
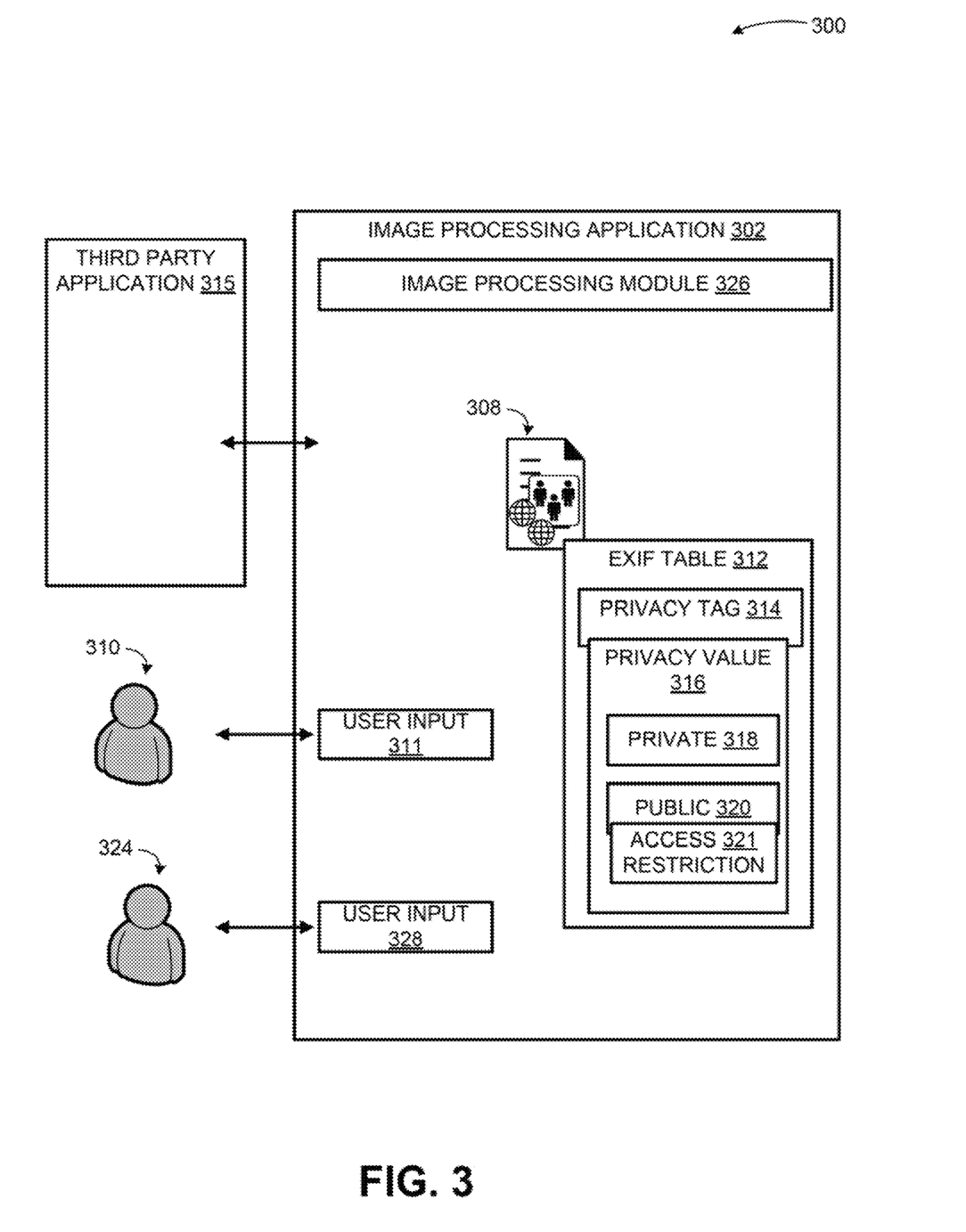
FIG. 3 is a display diagram illustrating components of a scheme to configure an image as private within a storage container, according to embodiments.

FIG. 3 is a display diagram illustrating components of a scheme to configure an image as private within a storage container, according to embodiments.

In a diagram 300, an image processing module 326 of an image processing application 302 may receive a request to edit an image 308 from a user 310. The image 308 may be processed to detect an EXIF table 312 associated with the image 308. The EXIF table 312 may include a privacy tag 314 and a privacy value 316 associated with the privacy tag 314. The privacy value 316 may be designated as private 318 or public 320. Next, the image 308 may be provided to the user 310 who may provide a user input 311 that includes an update to the privacy value 316. For example, the user 310 may change the privacy value 316 from private 318 to public 320. The privacy value 316 may be configured based on the update.

The image processing module 326 may process user input (311 or 328) provided by users (310 or 324) by verifying an identify of the users (310 or 324) to validate access to the image 308 by the users (310 or 324). For example, the image processing module 326 may detect an user input 328 by the user 324 to designate the privacy value 316 as public 320. Updating and/or changing the privacy value 316 to public (or private) may be restricted to authorized users. As such, the identity of the user 324 may be verified as a creator or an editor (or other authorized user) of the image 308. Upon the verification, the privacy value 316 may be designated as public on the EXIF table 312 of the image 308.

Alternatively, the image processing module 326 may receive the user input 328 to designate the privacy value 316 as public 320. However, the image processing module 326 may fail to verify (or refute) an identity of the user 324 as a creator or an editor (or other authorized user) of the image 308. In such a scenario, the user input 328 may be rejected.

The image processing module 326 may also receive a request from a third party application 315 for the image 308. The third party application 315 may be allowed to access the image 308 when the privacy value 316 is designated as public 320. However, access by the third party application may be restricted. An access restriction 321 associated with the third party application 315 may define how the third party application 315 may access the image 308.

The access restriction 321 may be integrated to the privacy value 316 to restrict the access of the third party application 315 to the image 308. In an example scenario, the image 308 may be provided to the third party application 315 based on the access restriction 321 (as defined in the privacy value 316). The access restriction 321 may apply to a download operation, a sharing operation, a viewing operation, an editing operation, a copying operation, and/or a saving operation, among other operation(s) associated with the image 308 granted to the third party application 315.

For example, the third party application 315 may be restricted to low priority download of the image 308 (such as allowing the third party application 315 to download when other activity(s) do not consume an available bandwidth). Furthermore, the third party application 315 may be restricted from sharing the image 308 with other application(s). The third party application 315 may also be restricted to solely allow a select set of user(s) to view the image 308. Similarly, editing, copying, and/or saving operations associated with the image 308 provided by the third party application 315 may be restricted to a select set of user(s) and/or entity(s) through the access restriction 321 that defines the third party application's access to the image 308.

Figure 4:
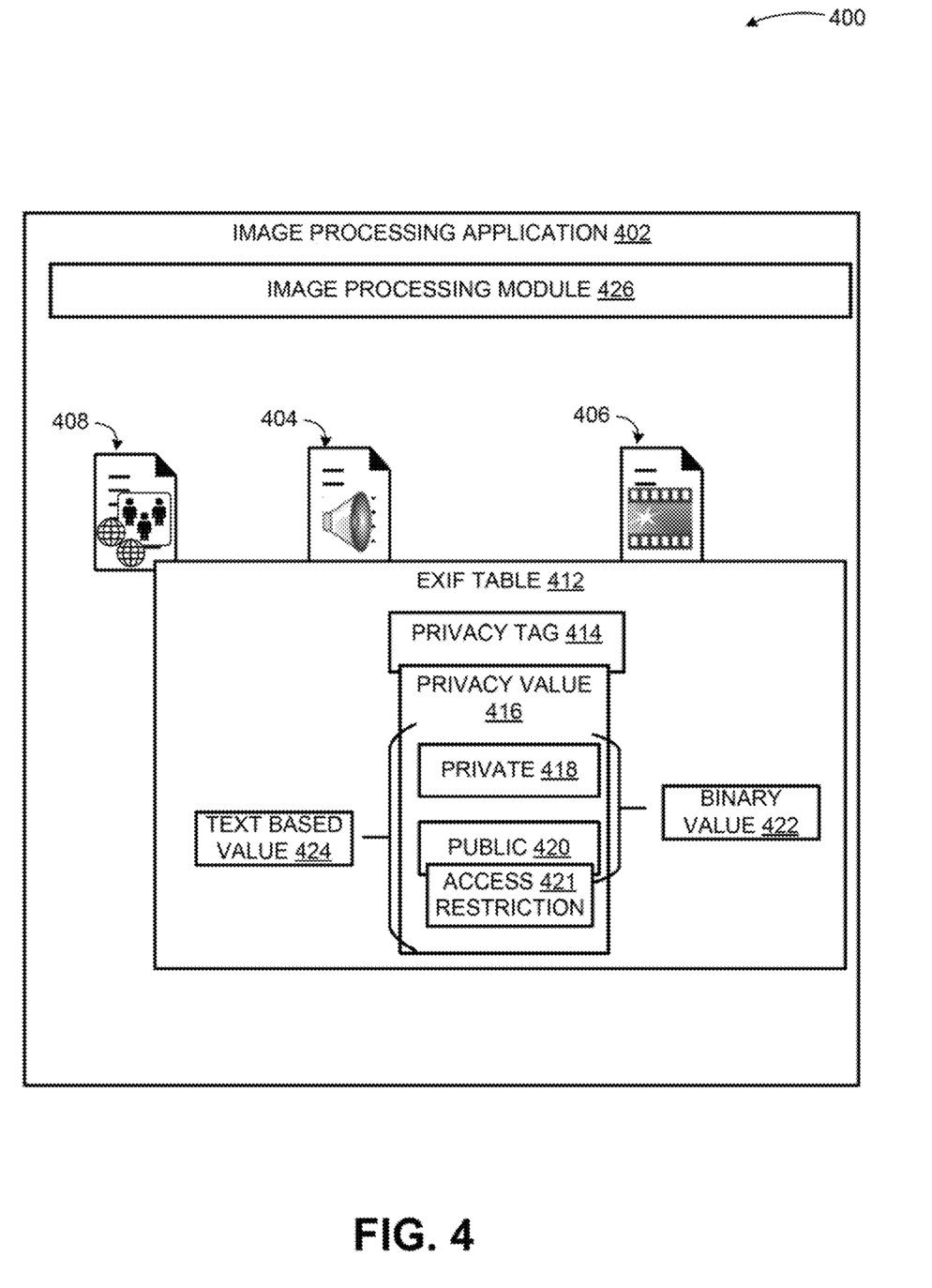
FIG. 4 is a display diagram illustrating an example of a user interface for configuring an image as private within a storage container, according to embodiments.

FIG. 4 is a display diagram illustrating an example of a user interface for configuring an image as private within a storage container, according to embodiments.

In a diagram 400, an image processing module 426 of an image processing application 402 may designate an image 408 as private 418 or public 420 through a privacy value 416 associated with a privacy tag 414 of an EXIF table 412. The EXIF table 412 may include tag and value pairs defining attributes of the image 408 such as size, color information, date/time of capture, date/time of modification, capture location, among other attributes. A privacy state associated with the image 408 may be captured in the EXIF table 412 with the privacy tag 414 and the privacy value 416 (that reflects the privacy state of the image 408). The privacy value 416 may be designated as private 418 or public 420 with a binary value 422. The binary value 422 of "0" may designate the privacy value 416 as public 420 and the binary value of "1" may designate the privacy value 416 as private 418. Alternatively, the binary value 422 of "1" may designate the privacy value 416 as public 420 and the binary value of "0" may designate the privacy value 416 as private 418.

Furthermore, a text based value 424 may be used to designate the privacy value 416 as private 418 or public 420. Access restriction 421 defining an access of the third party application 315 or an entity (such as a user) to the image 408 may also be described using the text based value 424 inserted into the privacy value 416. Furthermore, the access restriction 421 may include rules to designate, change, and/or update the privacy value 416. For example, the access restriction may demand a biometric based authentication of a user to verify an authorization of the user to designate, change, and/or update the privacy value 416. The biometric based authentication may be specified to a type such as iris pattern, ear pattern, thumbprint, facial pattern, and/or voice pattern, among others.

The privacy tag 414 and the privacy value 416 may further be used in the EXIF table 412 to define a privacy state of an audio stream 404 or a video stream 406. The privacy value 416 may be designated as private 418 or public 420 to designate the privacy state of the audio stream 404 or the video stream 406.

As discussed above, the image processing application 102 may be employed to configure an image as private within a storage container. An increased user efficiency with the image processing application 102 may occur as a result of configuring an image as private or public through an EXIF table of the image. Interactions with other application(s) and entity(s) requesting access to the image may be managed automatically based on the privacy state captured in the EXIF table which may reduce processor load, increase processing speed, conserve memory, and reduce network bandwidth usage.

Embodiments, as described herein, address a need that arises from a lack of efficiency to configure an image as private within a storage container. The actions/operations described herein are not a mere use of a computer, but address results that are a direct consequence of software used as a service offered to large numbers of users and applications.

The example scenarios and schemas in FIGS. 1 through 4 are shown with specific components, data types, and configurations. Embodiments are not limited to systems according to these example configurations. Configuring an image as private within a storage container may be implemented in configurations employing fewer or additional components in applications and user interfaces. Furthermore, the example schema and components shown in FIGS. 1 through 4 and their subcomponents may be implemented in a similar manner with other values using the principles described herein.

Figure 5:
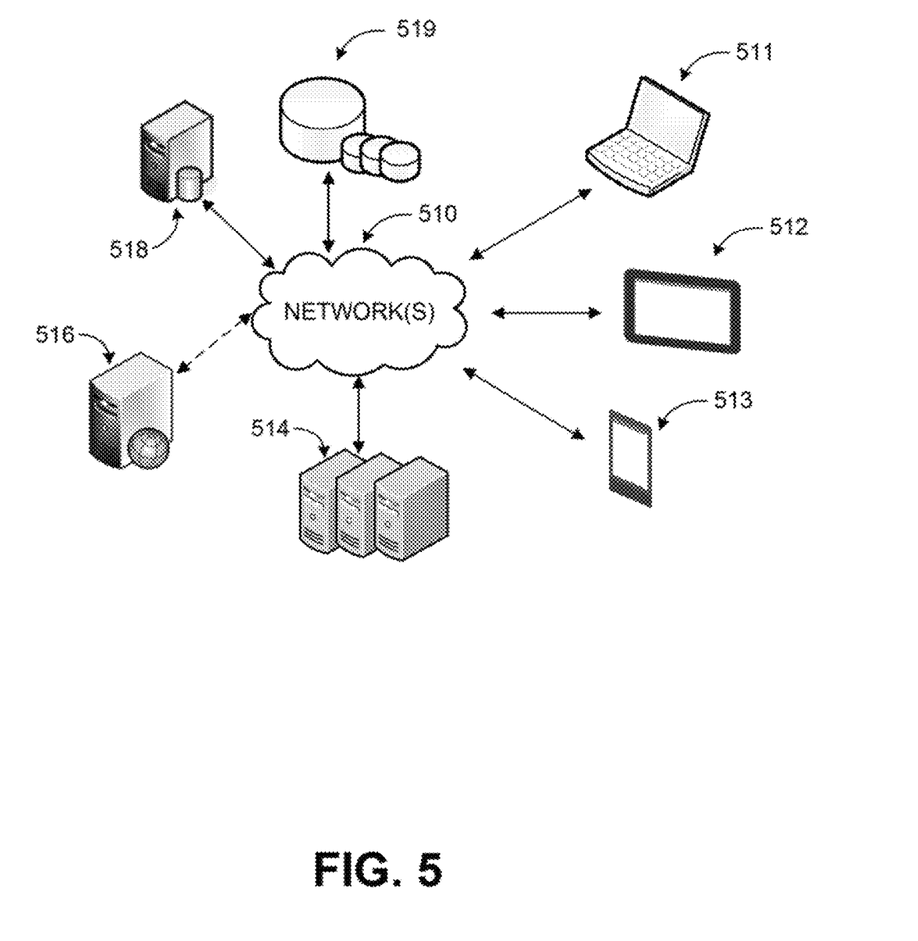
FIG. 5 is a simplified networked environment, where a system according to embodiments may be implemented.

FIG. 5 is an example networked environment, where embodiments may be implemented. An image processing application configuring an image as private within a storage container may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. An image processing application may receive an image captured by an image capture device. A metadata table may be generated for the image. The metadata table may include a privacy tag. A privacy value may be determined for the privacy tag. Next, the privacy tag may be configured based on the privacy value. The privacy tag may determine an access to the image based on the privacy value. The image may be stored with the metadata table in the storage container. The storage container may be hosted locally or in a cloud based storage. The image processing application may store data associated with the image in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to configure an image as private within a storage container. Furthermore, the networked environments discussed in FIG. 5 are for illustration purposes only. Embodiments are not limited to the example applications, modules, or processes.

Figure 6:
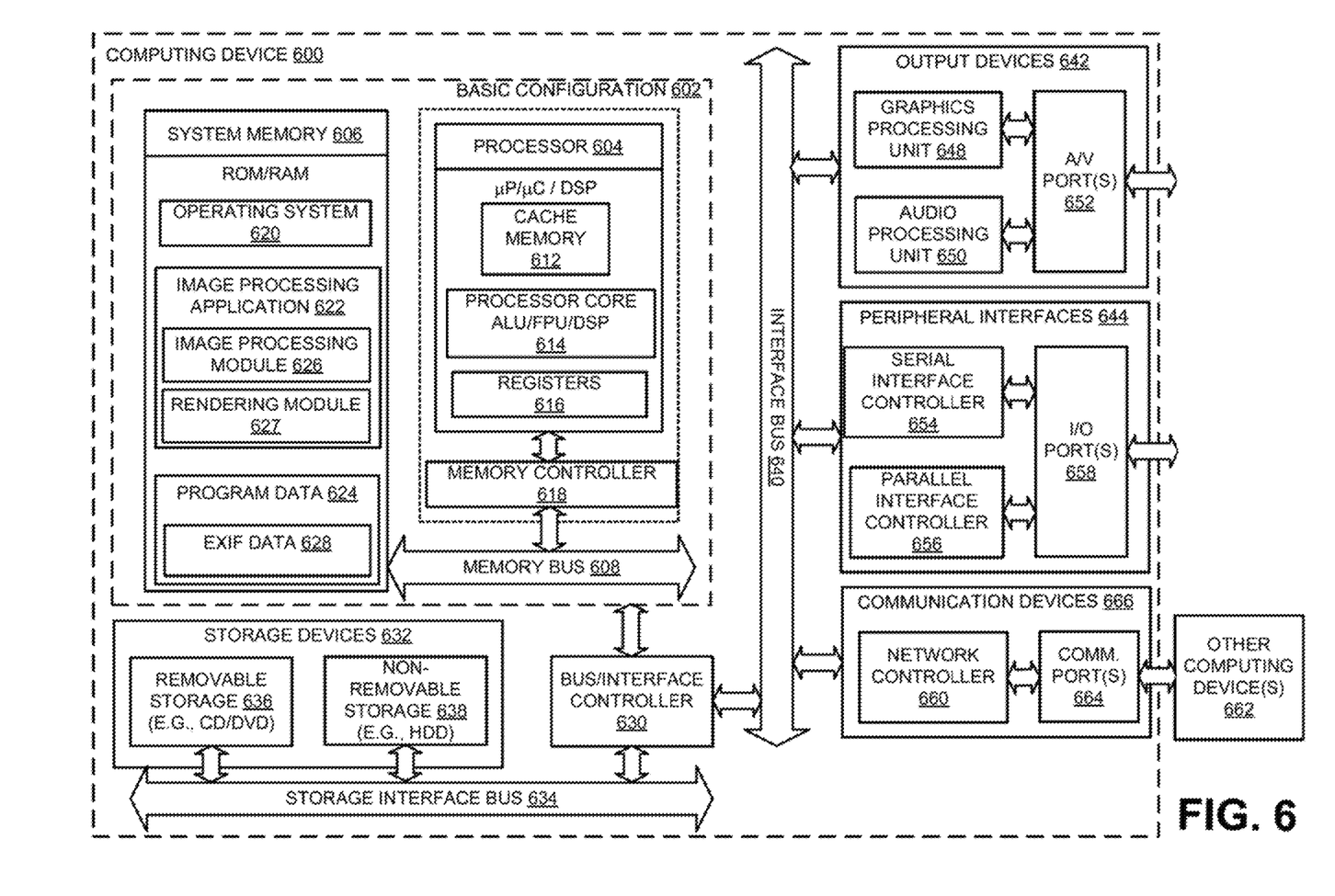
FIG. 6 is a block diagram of an example computing device, which may be used to configure an image as private within a storage container, according to embodiments.

FIG. 6 is a block diagram of an example computing device, which may be used to configure an image as private within a storage container, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 804 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, an image processing application 622, and a program data 624. The image processing application 622 may include components such as an image processing module 626 and a rendering module 627. The image processing module 626 and the rendering module 627 may execute the processes associated with the image processing application 622. The image processing module 626 may receive an image captured by an image capture device. A metadata table may be generated for the image. The metadata table may include a privacy tag. A privacy value may be determined for the privacy tag. Next, the privacy tag may be configured based on the privacy value. The privacy tag may determine an access to the image based on the privacy value. The rendering module 627 may store the image with the metadata table in the storage container. The storage container may be hosted locally or in a cloud based storage.

The image processing application 622 may configure the image as private in a storage container upon a capture of the image by an image capture device associated with the computing device 600. An example of the image capture device may include a camera, among others that may be communicatively coupled to the computing device 600. The program data 624 may also include, among other data, EXIF data 628, or the like, as described herein. The EXIF data 628 may include a privacy tag and a privacy value associated with the privacy tag.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to configure an image as private within a storage container. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
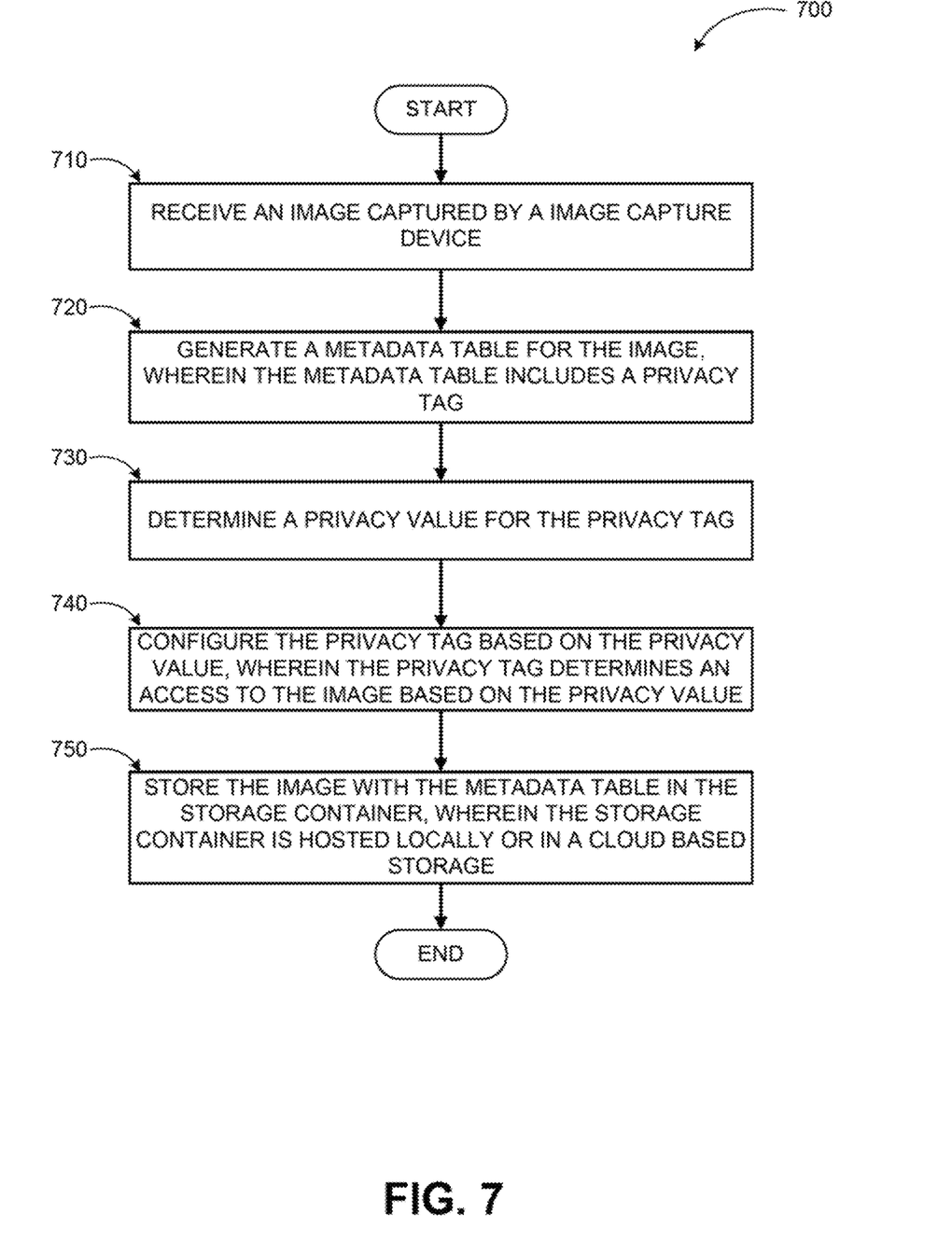
FIG. 7 is a logic flow diagram illustrating a process for configuring an image as private within a storage container, according to embodiments.

FIG. 7 is a logic flow diagram illustrating a process for configuring an image as private within a storage container, according to embodiments. Process 700 may be implemented on a computing device, such as the computing device 600 or another system.

Process 700 begins with operation 710, where an image processing application receives an image captured by an image capture device. The image capture device may include a camera of a mobile computing device such as a smartphone. A metadata table may be generated for the image at operation 720. The metadata table may include an exchangeable image file format (EXIF) table with tag and value pairs describing various attributes associated with the image.

The metadata table may include a privacy tag. The privacy tag may be a label and/or a description for a privacy value. At operation 730, the privacy value may be determined for the privacy tag. At operation 740, the privacy tag may be configured based on the privacy value. The privacy tag may determine an access to the image based on the privacy value. Options for the privacy value may include private (that denies access to the image by unauthorized users) and public (that provides access to the image). At operation 750, the image may be stored with the metadata table in the storage container. The storage container may be hosted locally or in a cloud based storage.

The operations included in process 700 is for illustration purposes. Configuring an image as private within a storage container may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples a computing device to configure an image as private within a storage container is described. The computing device includes an image capture device, a memory configured to store instructions associated with an image processing application, a processor coupled to the memory and the image capture device. The processor executes the image processing application in conjunction with the instructions stored in the memory. The image processing application includes an image processing module and a rendering module. The image processing module is configured to receive an image captured by the image capture device, generate a metadata table for the image, where the metadata table includes a privacy tag, determine a privacy value for the privacy tag, and configure the privacy tag based on the privacy value, where the privacy tag determines an access to the image based on the privacy value. The rendering module is configured to store the image with the metadata table in the storage container, where the storage container is hosted locally or in a cloud based storage.

In other examples, the metadata table includes an exchangeable image file format (EXIF) table. The privacy value is one of private or public. The image processing module is further configured to receive a binary value of "0" designated for the privacy value and designate the privacy value as public on the metadata table of the image. The image processing module is further configured to infer the privacy value based on one or more of a user attribute of a user associated with the image, an image capture location, and an image content.

In further examples, the image processing module is further configured to receive a user input to designate the privacy value as private and designate the privacy value as private. The image processing module is further configured to receive a request for the image from a third party application, provide a rejection in response to the request, generate a notification that describes the image as private, and transmit the notification to the third party application.

In other examples, the image processing module is further configured to receive a request for the image from a third party application, query and receive from a user an overwrite input, designate the privacy value as public on the metadata table of the image, and provide the image to the third party application. The image processing module is further configured to detect the overwrite input include an instruction to maintain the privacy value as public for a single instance and designate the privacy value as private on the metadata table of the image upon providing the image to the third party application. The image processing module is further configured to detect the overwrite input include an instruction to maintain the privacy value as public permanently and maintain the privacy value as public on the metadata table of the image.

In further examples, the image processing module is further configured to detect other user input provided by a user to designate the privacy value as public, verify an identity of the user as a creator or an editor of the image, and designate the privacy value as public on the metadata table of the image. The image processing module is further configured to detect other user input provided by a user to designate the privacy value as public, refute an identify of the user as a creator or an editor of the image, and reject the other user input.

In some examples, a method executed on a computing device to configure an image as private within a storage container is described. The method includes receiving a request to edit the image, detecting an exchangeable image file format (EXIF) table associated with the image, where the EXIF table includes a privacy tag and a privacy value associated with the privacy tag, providing the image to a user, receiving an update to the privacy value from the user, and configuring the privacy value based on the update.

In other examples, the method further includes receiving other request for the image from a third party application and determining an access restriction associated with the third party application and the image. The method further includes designating the privacy value based on the access restriction and providing the image to the third party application. The access restriction applies to one or more of a downloading operation, a sharing operation, a viewing operation, an editing operation, a copying operation, and a saving operation associated with the image. The method further includes verifying the user as authorized to designate the privacy value as public and providing the EXIF table to the user to register the update directly on the privacy value.

In some examples, a computer-readable memory device with instructions stored thereon to configure an image as private within a storage container. The instructions include actions that are similar to the method.

In some examples, a means for configuring an image as private within a storage container is described. The means for configuring an image as private within a storage container includes a means for receiving an image captured by an image capture device, a means for generating a metadata table for the image, where the metadata table includes a privacy tag, a means for determining a privacy value for the privacy tag, a means for configuring the privacy tag based on the privacy value, where the privacy tag determines an access to the image based on the privacy value, and a means for storing the image with the metadata table in the storage container, where the storage container is hosted locally or in a cloud based storage.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to configure an image as private within a storage container, the computing device comprising:
   an image capture device;
   a memory configured to store instructions associated with an image processing application;
   a processor coupled to the memory and the image capture device, the processor executing the image processing application in conjunction with the instructions stored in that memory to:
      receive an image captured by the image capture device;
      automatically select a privacy value for the image based on at least one selected from a group consisting of content of the image and an attribute of a user associated with the image;
      add the privacy value to an exchangeable image file format (EXIF) table associated with the image generated by the image capture device; and
      store the image with the EXIF table in the storage container, wherein the storage container is hosted locally or in a cloud based storage and wherein access to the image as stored is controlled based on the privacy value.

2. The computing device of claim 1, wherein the privacy value is one of private or public.

3. The computing device of claim 1, wherein the processor is further configured to:
   receive a binary value of "0" designated for the privacy value; and
   designate the privacy value as public on the metadata table of the image.

4. The computing device of claim 1, wherein the processor is further configured to:
   receive a user input to designate the privacy value as private; and
   designate the privacy value as private.

5. The computing device of claim 4, wherein the processor is further configured to:
   receive a request for the image from a third party application;
   provide a rejection in response to the request based on the privacy value;
   generate a notification that describes the image as private; and
   transmit the notification to the third party application.

6. The computing device of claim 4, wherein the processor is further configured to:
   receive a request for the image from a third party application;
   query and receive from a user an overwrite input;
   designate the privacy value as public on the metadata table of the image; and
   provide the image to the third party application.

7. The computing device of claim 4, wherein the processor is further configured to:
   receive a request for the image from a third party application;
   query for and receive from a user an overwrite input;
   detect that the overwrite input includes an instruction to maintain the privacy value as public for a single instance;
   provide the image to the third party application; and
   designate the privacy value as private on the metadata table of the image upon providing the image to the third party application.

8. The computing device of claim 4, wherein the processor is further configured to:
   receive a request for the image from a third party application;
   query for and receive from a user an overwrite input;
   detect that the overwrite input includes an instruction to maintain the privacy value as public permanently;
   provide the image to the third part application; and
   maintain the privacy value as public on the metadata table of the image.

9. The computing device of claim 1, wherein the processor is further configured to:
   detect other user input provided by a user to designate the privacy value as public;
   verify an identity of the user as a creator or an editor of the image; and
   designate the privacy value as public on the metadata table of the image.

10. The computing device of claim 1, wherein the processor is further configured to:
    detect other user input provided by a user to designate the privacy value as public;
    refute an identity of the user as a creator or an editor of the image; and
    reject the other user input.

11. A method executed on a computing device to configure an image as private within a storage container, the method comprising:
    receiving an image captured by the image capture device;
    detecting an exchangeable image file format (EXIF) table with a privacy value associated with the image;
    automatically setting the privacy value for the image based on at least one selected from a group consisting of content of the image and an attribute of a user associated with the image; and
    storing the image with the EXIF table in the storage container, wherein the storage container is hosted locally or in a cloud based storage and wherein access to the image as stored is controlled based on the privacy value;

receiving an update to the privacy value from the user;

verifying the user as authorized to designate the privacy value as public; and providing the EXIF table to the user to register the update directly on the privacy value.

12. The method of claim 11, further comprising:

receiving a request for the image from a third party application; and determining an access restriction associated with the third party application and the image.

13. The method of claim 12, further comprising:

designating the privacy value based on the access restriction; and providing the image to the third party application.

14. The method of claim 12, wherein the access restriction applies to one or more of a downloading operation, a sharing operation, a viewing operation, an editing operation, a copying operation, and a saving operation associated with the image.

15. A computer-readable memory device with instructions stored thereon to configure an image as private within a storage container, the instructions comprising:

receiving an image captured by the image capture device;

detecting an exchangeable image file format (EXIF) table with a privacy value associated with the image;

automatically setting the privacy value for the image based on at least one selected from a group consisting of content of the image and an attribute of a user associated with the image;

storing the image with the EXIF table in the storage container, wherein the storage container is hosted locally or in a cloud based storage and wherein access to the image as stored is controlled based on the privacy value;

receiving a user input to designate the privacy value as private;

designating the privacy value as private;

receiving a request for the image from a third party application;

providing a rejection in response to the request based on the privacy value;

generating a notification that describes the image as private; and transmitting the notification to the third party application.

16. The computer-readable memory device of claim 15, wherein the instructions further comprise:

receiving a second request for the image from the third party application;

determining an access restriction associated with the third party application and the image, wherein the access restriction applies to one or more of a downloading operation, a sharing operation, a viewing operation, an editing operation, a copying operation, and a saving operation associated with the image;

designating the privacy value based on the access restriction; and providing the image to the third party application in response to the second request.

* * * * *